(12) United States Patent
West et al.

(10) Patent No.: US 7,897,119 B2
(45) Date of Patent: Mar. 1, 2011

(54) CATALYTIC REACTOR

(75) Inventors: David James West, Ducklington (GB);
Michael Joseph Bowe, Preston (GB);
Robert Frew Gillespie, Abingdon (GB);
Steven Brabon, Wantage (GB); Robert Peat, Longcot (GB)

(73) Assignee: CompactGTL plc

( * ) Notice: Subject to any disclaimer, the term of this patent is extended or adjusted under 35 U.S.C. 154(b) by 730 days.

(21) Appl. No.: 11/740,897

(22) Filed: Apr. 26, 2007

(65) Prior Publication Data
US 2007/0258872 A1    Nov. 8, 2007

(30) Foreign Application Priority Data
May 8, 2006 (GB) ................... 06 08927.0

(51) Int. Cl.
*B01J 8/02* (2006.01)
(52) U.S. Cl. ......... 422/211; 422/222; 422/190; 422/177; 422/174; 48/127.9; 48/127.5; 48/127.7
(58) Field of Classification Search ........... 422/222, 422/198, 211, 220, 204, 190, 192, 196
See application file for complete search history.

(56) References Cited

U.S. PATENT DOCUMENTS

| | | | |
|---|---|---|---|
| 4,134,425 A | 1/1979 | Gussefeld | |
| 4,471,821 A | 9/1984 | Coulon | |
| 5,375,999 A * | 12/1994 | Aizawa et al. | 431/328 |
| 5,591,413 A * | 1/1997 | Toyoda | 422/180 |
| 5,592,521 A | 1/1997 | Hill | |
| 5,609,834 A * | 3/1997 | Hamada et al. | 422/196 |
| 5,645,891 A | 7/1997 | Liu et al. | |
| 5,776,421 A * | 7/1998 | Matsumura et al. | 422/197 |
| 7,087,651 B2 | 8/2006 | Lee-Tuffnell et al. | |
| 7,186,388 B2 | 3/2007 | Bowe et al. | |
| 7,189,271 B2 | 3/2007 | Maude | |
| 7,201,883 B2 | 4/2007 | Bowe et al. | |
| 7,223,373 B2 | 5/2007 | Maude | |
| 7,235,218 B2 | 6/2007 | Bowe | |
| 7,300,635 B2 | 11/2007 | Bowe et al. | |
| 2002/0071797 A1 | 6/2002 | Loffler et al. | |
| 2003/0096204 A1 * | 5/2003 | Hermann et al. | 431/7 |

(Continued)

FOREIGN PATENT DOCUMENTS

DE    19852951 A1    5/2000

(Continued)

OTHER PUBLICATIONS

PCT Search Report and Written Opinion (PCT/GB2007/050200), dated Apr. 19, 2007.

(Continued)

*Primary Examiner* — Alexa D. Neckel
*Assistant Examiner* — Kaity V. Handal
(74) *Attorney, Agent, or Firm* — McDermott Will & Emery LLP

(57) ABSTRACT

A compact catalytic reactor defines a multiplicity of first and second flow channels arranged alternately, the first flow channels being no more than 10 mm deep and providing flow paths for combustible reactants, and containing a catalyst structure (20) to catalyze combustion of the reactants, and having at least one inlet for at least one of the reactants. The first flow channel also includes an insert (40 or 60) adjacent to each inlet, this insert not being catalytic to the combustion reaction; the insert may define gaps which are narrower than the maximum gap size for preventing flame propagation.

8 Claims, 2 Drawing Sheets

U.S. PATENT DOCUMENTS

| | | |
|---|---|---|
| 2004/0180785 A1 | 9/2004 | Jiang et al. |
| 2004/0198598 A1 | 10/2004 | Kawano et al. |
| 2004/0228780 A1 | 11/2004 | Butler |
| 2005/0189097 A1* | 9/2005 | Fowser et al. ............... 165/166 |
| 2006/0035182 A1 | 2/2006 | Hesse |
| 2006/0245987 A1* | 11/2006 | Schmidt ..................... 422/198 |
| 2007/0212276 A1* | 9/2007 | Papavassiliou et al. ...... 422/211 |

FOREIGN PATENT DOCUMENTS

| | | |
|---|---|---|
| DE | 19931902 | 1/2001 |
| DE | 10056673 A1 | 5/2002 |
| EP | 0718031 A | 6/1996 |
| EP | 1123753 | 8/2001 |
| EP | 1287884 A2 | 5/2003 |
| FR | 2824755 | 11/2002 |
| GB | 2322633 | 9/1998 |
| WO | 0176730 | 10/2001 |
| WO | WO 2004015167 | 2/2004 |
| WO | WO 2005/011864 | 2/2005 |
| WO | 2005102511 A1 | 11/2005 |

OTHER PUBLICATIONS

GB Search Report (GB0608927.0), dated Sep. 7, 2006.
Foreign Search Report for Application No. GB0515276.4 dated Sep. 1, 2005.
Foreign Search Report for Application No. PCT/GB2006/050194 dated Dec. 22, 2005.
Foreign Search Report for Application No. PCT/GB2006/050194 dated Feb. 7, 2008.

* cited by examiner

CATALYTIC REACTOR

This invention relates to a catalytic reactor for a chemical reaction such as combustion, in which the reactants may undergo deflagration or detonation, the reactor inhibiting such deleterious phenomena.

A plant and process are described in WO 2005/102511 (GTL Microsystems AG) in which methane is reacted with steam, to generate carbon monoxide and hydrogen in a first catalytic reactor; the resulting gas mixture is then used to perform Fischer-Tropsch synthesis in a second catalytic reactor. The reforming reaction is typically carried out at a temperature of about 800° C., and the heat required may be provided by catalytic combustion in channels adjacent to those in which reforming is carried out, the combustion channels containing a catalyst which may comprise palladium or palladium/platinum on an alumina support in the form of a thin coating on a metallic substrate. An inflammable gas mixture such as a mixture of methane or hydrogen and air is supplied to the combustion channels. Combustion occurs at the surface of the catalyst without a flame, but there is a risk that the gas mixture may undergo a deflagration or a detonation, these phenomena being distinguished by whether the combustion wave or flame front propagates below or above the speed of sound in the unburnt gas mixture, respectively. It would be desirable to prevent flames propagating through the combustible gas mixture, whether as a deflagration or a detonation, as such flame propagation would change the temperature profile within the reactor, and may cause mechanical damage.

According to the present invention there is provided a compact catalytic reactor, the reactor defining a multiplicity of first and second flow channels arranged alternately, the first flow channels having a transverse dimension no more than 10 mm and providing flow paths for combustible reactants and containing a removable fluid-permeable catalyst structure to catalyse combustion of the reactants, the first flow channels having at least one inlet for at least one of the reactants, wherein each first flow channel includes an insert adjacent to each inlet, this insert not being catalytic to the combustion reaction.

Preferably the non-catalytic insert is of a material that does not form an alumina surface coating, as it has been found that such an alumina coating is itself slightly catalytic even in the absence of catalytic materials such as palladium. For example suitable metals are iron/nickel/chromium alloys for high-temperature use, such as Haynes HR-120 or Incoloy 800HT (trade marks), stainless steel or similar materials.

The reactor may comprise a stack of plates. For example, the first and second flow channels may be defined by grooves in respective plates, the plates being stacked and then bonded together. Alternatively the flow channels may be defined by thin metal sheets that are castellated and stacked alternately with flat sheets; the edges of the flow channels may be defined by sealing strips. To ensure the required good thermal contact both the first and the second gas flow channels may be between 10 mm and 2 mm deep, preferably less than 6 mm deep, more preferably in the range 3 mm to 5 mm. The stack of plates forming the reactor module is bonded together for example by diffusion bonding, brazing, or hot isostatic pressing.

The catalyst structure preferably has a metal substrate to provide strength and to enhance thermal transfer by conduction, so preventing hotspots. Typically the metal substrate would be covered with a ceramic coating into which active catalytic material is incorporated. Preferably the metal substrate for the catalyst structure, unlike that of the non-catalytic insert, is a steel alloy that forms an adherent surface coating of aluminium oxide when heated, for example an aluminium-bearing ferritic steel (eg Fecralloy(™)). When this metal is heated in air it forms an adherent oxide coating of alumina, which protects the alloy against further oxidation and against corrosion. Where the ceramic coating is of alumina, this appears to bond to the oxide coating on the surface. Preferably each catalyst structure is shaped so as to subdivide the flow channel into a multiplicity of parallel flow sub-channels, with catalytic material on surfaces within each such sub-channel. The substrate may be a foil, a wire mesh or a felt sheet, which may be corrugated, dimpled or pleated; the preferred substrate is a thin metal foil for example of thickness less than 100 μm, which is corrugated.

As is described in US 2006/0035182, one parameter for assessing if a reaction channel can experience flame propagation is known as the safe quenching distance or quenching gap, which is the maximum channel width that ensures suppression of all flame propagation at a specific pressure and temperature. If the channel gap is greater than the quenching gap, flame propagation may be possible, and a flame may become a deflagration, that is a combustion wave propagating at subsonic velocity. In practice the maximum gap (at which flame propagation is suppressed) is actually significantly larger than the quenching gap, at least for channels of a rectangular cross-section, and is approximately equal to the detonation cell size. Both of these parameters depend on the nature of the flammable material, on how close the composition is to the stoichiometric ratio, and on the temperature and pressure. By way of example, for a stoichiometric mixture of hydrogen and air (as a source of oxygen) at an initial state of 1 atmosphere and about 25° C., the quench gap is about 0.1 mm, but the maximum gap size is about 5 mm. The maximum gap size with hydrogen in oxygen is about 1.2 mm. These values for maximum gap size decrease as the temperature increases, and decrease as the pressure increases. For other fuel mixtures the values are typically larger, for example for ethane in air the quench gap is about 1.5 mm (and the maximum gap size is about 50 mm).

If the gas supplied to the inlet is itself combustible, for example consisting of a mixture of fuel and air, then the non-catalytic insert preferably subdivides a portion of the first flow channel adjacent to the inlet into a multiplicity of narrow flow paths which are narrower than the maximum gap size for preventing flame propagation. In this case the non-catalytic insert may be a longitudinally-corrugated foil or a plurality of longitudinally-corrugated foils in a stack. Such narrow flow paths also encourage laminar flow. This is preferably combined with heat exchange means to ensure that the non-catalytic insert is maintained at a lower temperature than the combustion catalyst in the first flow channel. Alternatively or additionally, where such combustible gas is supplied through a header to a multiplicity of first flow channels, then such a non-catalytic insert may be provided within the header.

Alternatively the gas supplied to the inlet may comprise only one of the combustion reactants (for example only air), and in this case the other reactants (the fuel) may be supplied through apertures directly into the first flow channels. In this case the foil insert may be shaped to mix the injected reactants thoroughly with the reactants entering through the inlet. The other reactants may be added in stages, at different positions along the first flow channel, such that the gas mixture in the first flow channel is well below the stoichiometric ratio throughout the length of the first flow channel, and the flow paths defined by the catalyst structure being sufficiently narrow to prevent flame propagation. Alternatively, if all the other reactants are added adjacent to the inlet of the first flow channel, there may be a first non-catalytic insert to bring about thorough mixing, immediately followed by a second non-catalytic insert to define narrow channels both to promote laminar flow and to suppress flame propagation, the second non-catalytic insert being between the first non-catalytic insert and the combustion catalyst.

The invention will now be further and more particularly described, by way of example only, and with reference to the accompanying drawings, in which.

The steam reforming reaction is brought about by mixing steam and methane, and contacting the mixture with a suitable catalyst at an elevated temperature so the steam and methane react to form carbon monoxide and hydrogen. The temperature in the reformer reactor typically increases from about 450° C. at the inlet to about 800-850° C. at the outlet. The steam reforming reaction is endothermic, and the heat is provided by catalytic combustion, for example of hydrocarbons and hydrogen mixed with air. The combustion takes place over a combustion catalyst within adjacent flow channels within the reforming reactor.

Figure 1:
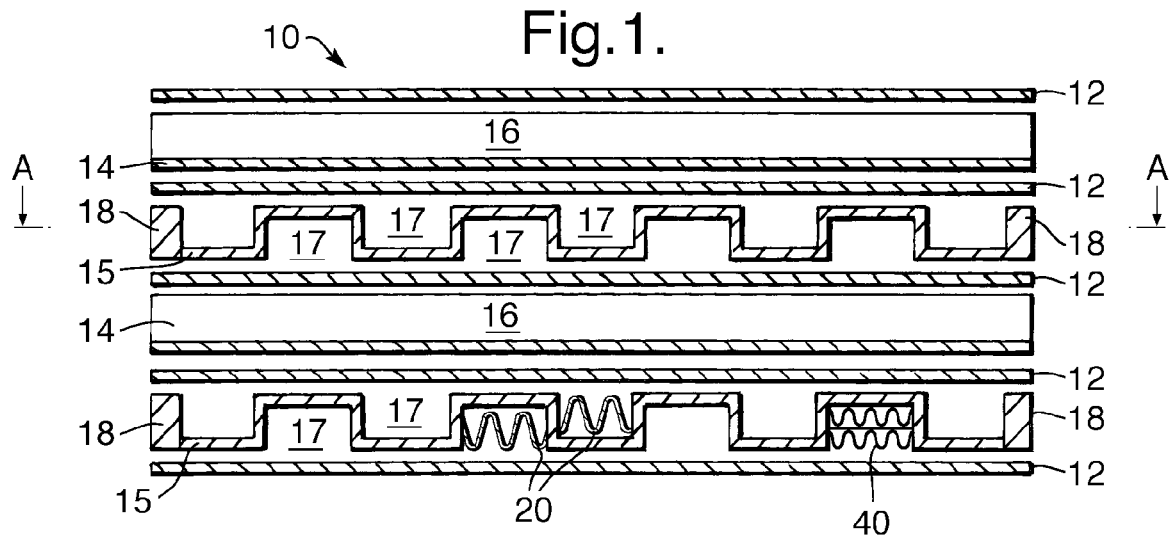
FIG. 1 shows a sectional view of part of a reactor block suitable for steam/methane reforming, with the parts shown separated for clarity.

Referring now to FIG. 1 there is shown a reactor 10 suitable for use as a steam reforming reactor. The reactor 10 consists of a stack of plates that are rectangular in plan view, each plate being of corrosion resistant high-temperature alloy such as Inconel 625, Incoloy 800HT or Haynes HR-120. Flat plates 12, typically of thickness in the range 0.5 to 4 mm, in this case 1 mm thick are arranged alternately with castellated plates 14, 15 in which the castellations are such as to define straight-through channels 16, 17 from one side of the plate to the other. The castellated plates 14 and 15 are arranged in the stack alternately, so the channels 16, 17 are oriented in orthogonal directions in alternate castellated plates. The thickness of the castellated plates 14 and 15 (typically in the range between 0.2 and 3.5 mm) is in each case 0.75 mm. The height of the castellations (typically in the range 2-10 mm) is 4 mm in this example, and solid bars 18 of the same thickness are provided along the sides. In the castellated plates 15 which define the combustion channels 17 the wavelength of the castellations is such that successive ligaments are 25 mm apart, while in the castellated plates 14 which define the reforming channels 16 successive ligaments are 15 mm apart.

Figure 2:
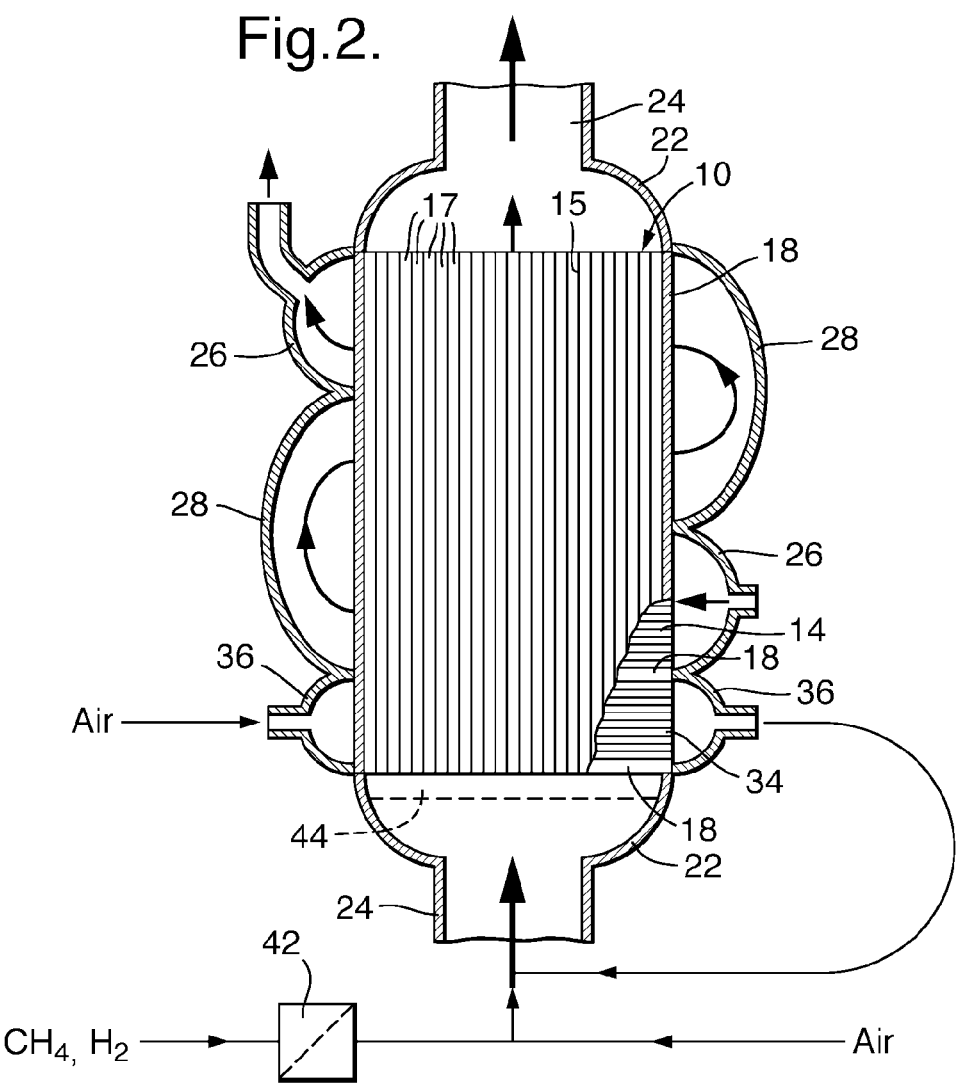
FIG. 2 shows a sectional view of the assembled reactor block on the line A-A of FIG. 1.

Referring now to FIG. 2, which shows a sectional view through the assembled reactor 10, each plate 12 is rectangular, of width 600 mm and of length 1400 mm; the section is in a plane parallel to one such plate 12. The castellated plates 15 for the combustion channels 17 are of the same area in plan, the castellations running lengthwise. The castellated plates 14 for the reforming channels 16 are 600 mm by 400 mm, three such plates 14 being laid side-by-side, with edge strips 18 between them, with the channels 16 running transversely; a castellated plate 34 with identical castellations, 600 mm by 200 mm in plan, is laid side-by-side with one of the plates 14. Headers 22 at each end of the stack enable the combustion gases to be supplied to, and the exhaust gases removed from, the combustion channels 17 through pipes 24. Small headers 26 (bottom right and top left as shown) enable the gas mixture for the reforming reaction to be supplied to the channels 16 in the first of the castellated plates 14, and the resulting mixture to be removed from those in the third castellated plate 14; double-width headers 28 (top right and bottom left as shown) enable the gas mixture to flow from one castellated plate 14 to the next. Separate small headers 36 communicate with the channels defined by the plates 34. The overall result is that the gases undergoing reforming follow a serpentine path that is generally co-current relative to the flow through the combustion channels 17.

The stack is assembled as described above, and bonded together typically by diffusion bonding, brazing, or hot isostatic pressing. Corrugated metal foil catalyst carriers 20 (only two of which are shown, in FIG. 1) are then inserted into each of the channels 16 and 17, carrying catalysts for the two different reactions. The metal foil is preferably of an aluminium-containing steel alloy such as Fecralloy, and this is covered with a ceramic coating containing the catalyst. In the reforming channels 16 (in the plates 14) the catalyst carriers 20 extend the entire length of the channel. In the combustion channels 17 the catalyst carriers 20 are of length 1200 mm, so that they extend alongside the reforming channels 16; the first 200 mm length of each channel 17 is instead occupied by a non-catalytic corrugated foil insert 40 (only one is shown, in FIG. 1) made of a stack of two corrugated foils and a flat foil, the wavelength of the corrugations being such that the flow paths are significantly smaller than those through the catalyst carriers 20, and in this case the foil is of stainless steel. After insertion of the catalyst carriers 20 and the non-catalytic inserts 40, the headers 22, 26, 28 and 36 are attached to the outside of the stack, as shown in FIG. 2. The catalyst carriers 20 and the non-catalytic inserts 40 are not shown in FIG. 2, and are shown only diagrammatically in FIG. 1.

In use the mixture of steam and methane is supplied to the inlet header 26 (right-hand side as shown), so that the steam/methane mixture follows the serpentine path as mentioned above. Combustion fuel (for example methane and hydrogen) is supplied through a detonation arrester 42 to the inlet header 22 (bottom end as shown) and is mixed with air, part of which is supplied directly and part of which is supplied through the headers 36 and the flow channels in the castellated plates 34 to be preheated. The air flowing through the channels in the castellated plates 34 is flowing adjacent to the inlet portions of the channels 17 which contain the non-catalytic inserts 40, and helps to hold the inserts 40 at a temperature lower than that in the remaining parts of the channels 17, and at the same time this air is pre-heated. The inserts 40 define flow paths in which the maximum gaps are about 1 mm, which is small enough to ensure that detonations cannot propagate with this particular gas mixture; the narrow gaps also favour laminar flow, which helps to suppress the risk of flame propagation. Furthermore, although the catalyst carriers 20 in the downstream portions of the channels 17 may be at a temperature of above 600° C., for example at 800 or 850° C., the air flowing through the channels in the plates 34, along with the in-flowing mixture of fuel and air, ensure that the non-catalytic inserts 40 are at a significantly lower temperature of say 400° C.

It will be appreciated that the reactor design shown in the figures is by way of example only, and that the invention is applicable in any catalytic reactor in which the reactants could undergo detonation. For example it is equally applicable in a reactor in which flow channels are defined by grooves in flat plates, or by bars and flat plates, or indeed where flow channels are defined by apertures in plates. It will also be appreciated that the reactor may differ from that shown, while remaining within the scope of the present invention. The non-catalytic inserts 40 will typically be of a length between 50 and 500 mm, the maximum widths of the flow paths being in the range 0.1 to 3 mm, and the foil thickness is typically in the range 20 to 200 µm. The insert 40 are conveniently made of flat and corrugated foils, but it will be appreciated that they may be constructed in a different fashion. In some cases it may not be necessary to provide the additional cooling to the non-catalytic inserts 40 provided by the air flowing in the castellated plates 34, as they may be cooled sufficiently by the in-flowing fuel/air mixture. It will be appreciated that if additional cooling were to be required, an endothermic reaction might instead be carried out in the channels in the castellated plates 34.

It will also be appreciated that, in addition to the non-catalytic inserts 40, combustion flame propagation can be further prevented by additional steps, for example by adding an essentially inert component to the fuel/air mixture, such as steam or carbon dioxide, as this would reduce the combustion kinetics, making flame propagation less likely. It will also be appreciated that an additional quenching zone, containing such non-catalytic inserts 40, may also be provided at the outlet end of the combustion channels 17, to prevent flame propagation at the outlet (in the header 22) or a deflagration or detonation event propagating through the duct 24, especially during start-up. Alternatively the fuel/air mixture might contain excess oxygen (excess air) so that there is stoichiometric excess, which would also inhibit flame propagation.

Alternatively or additionally a non-catalytic insert 44 (indicated in broken lines in FIG. 2) in the form of a honeycomb structure may be provided within the inlet header 22 and optionally within the outlet header 22 also. This honeycomb insert 44 defines channels like those of the inserts 40 which are narrow enough to prevent flame propagation and so to prevent detonations. For example each channel might be of width 0.5 mm or 0.8 mm. Such a honeycomb insert 44 may be arranged up against the face of the stack in which are the open ends of the combustion channels 17, and any clearance gap between the honeycomb insert 44 and the surrounding wall of the header 22 is desirably also narrow enough to prevent flame propagation.

Figure 3:
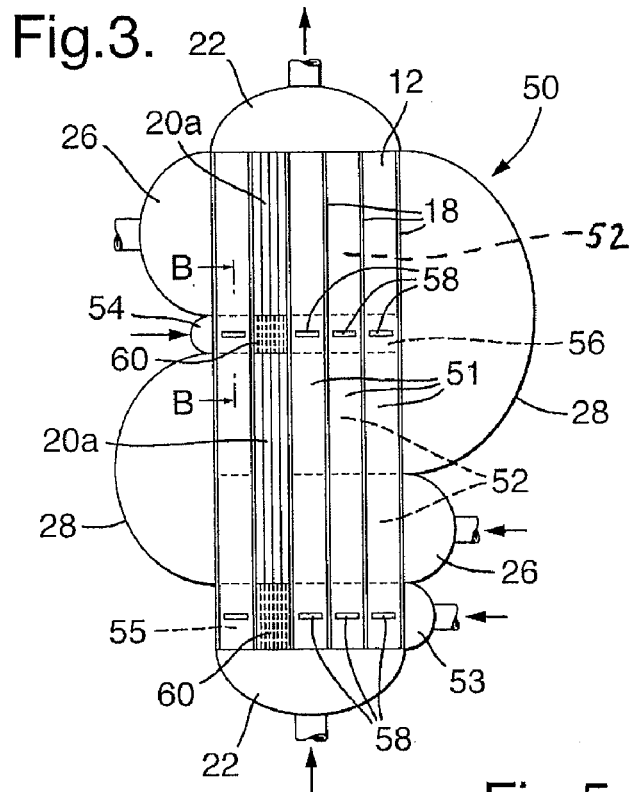
FIG. 3 shows a sectional view of an alternative reactor.

Alternatively the fuel may be supplied in stages along the length of the combustion channels 17 (through two or more inlets) to ensure that the fuel/air proportion is always well below stoichiometry. This has the additional advantage that the required quench gap is larger. Referring now to FIG. 3 there is shown a reactor 50 with some similarities to that of FIGS. 1 and 2, identical components being referred to by the same reference numbers. In this case channels 51 and 52 for combustion and for steam/methane reforming are defined between flat plates 12 by bars 18. FIG. 3 shows the sectional view in the plane of one of the sets of combustion channels 51; such combustion channels alternate in the stack with transverse channels 52 for steam/methane reforming between the headers 26, 28, 28 and 26. Catalyst carriers 20*a* and 20*b* (of the same width as the corresponding channel) are provided in each of the channels 51 and 52 respectively. Inlet headers 53 and 54 communicate with transverse channels 55 and 56 (indicated by broken lines) adjacent to the inlet end of the combustion channels 51 and between the second and third transverse channels 52 for steam/methane reforming respectively; the other end of the transverse channels 55 and 56 are closed by corresponding side bars 18 (like those shown in FIG. 1). Slots 58 in the plates 12 allow fluid flow between the transverse channels 55 and 56 and the combustion channels 51.

Figure 4:
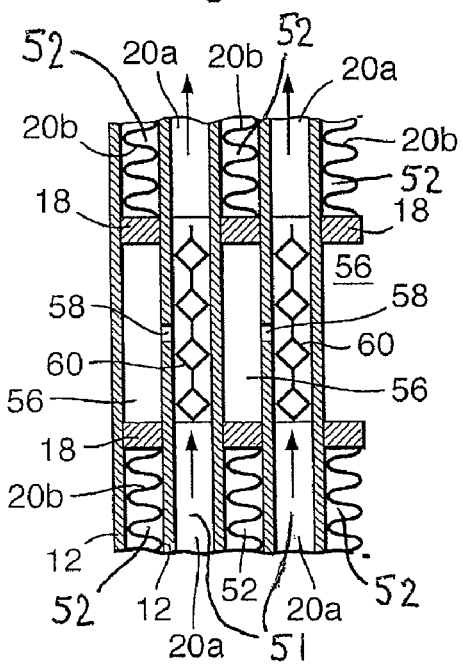
FIG. 4 shows a part sectional view of the reactor of FIG. 3 on the line B-B.

In use of the reactor 50 a steam/methane mixture is supplied to the inlet header 26 to follow the serpentine path as described earlier, while air is supplied to the inlet header 22. Referring also to FIG. 4, which shows a sectional view of part of the reactor 50, fuel is supplied to the inlet headers 53 and 54 and so into the transverse channels 55 and 56, and so through the slots 58 into the combustion channels 51. The portion of the combustion channels 51 in the vicinity of the slots 58 contains a non-catalytic insert 60 formed of foil shaped to enhance turbulence, so that the air or the hot combustion gases are turbulent when the fuel is injected, and the turbulence continues a short distance downstream of the slots 58, sufficient to ensure thorough mixing. The mixture then reaches a catalyst carrier 20*a*, so that combustion occurs. The proportion of fuel to air at each stage is well below the stoichiometric value, ensuring that detonation will not occur. (The inserts 60 and the carriers 20*a* are indicated in FIG. 3 in only one of the channels 51.)

Figure 5:
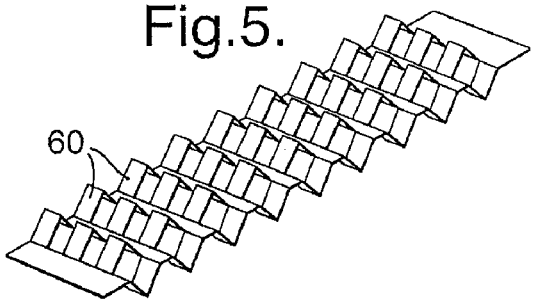
FIG. 5 shows a perspective view of an insert forming part of the reactor of FIGS. 3 and 4.

By way of example the inserts 60 may be of the shape shown in FIG. 5, made from a flat foil cut with a multiplicity of parallel slits, and with the portions of foil on opposite sides of each slit deformed respectively into a peak and a trough, so that peaks and troughs alternate across the width of the foil. Along the length of the foil peaks may be followed by peaks, and troughs by troughs, as shown; or alternatively peaks and troughs may alternate along any line along the length. Adding the fuel in stages along the length of the combustion channels 51 ensures that the fuel to air ratio throughout the length of the channels 51 is well below the stoichiometric value, and hence the gaps defined by the corrugated foil catalyst carriers 20*a* may be less than the maximum gap size for preventing flame propagation.

Figure 6:
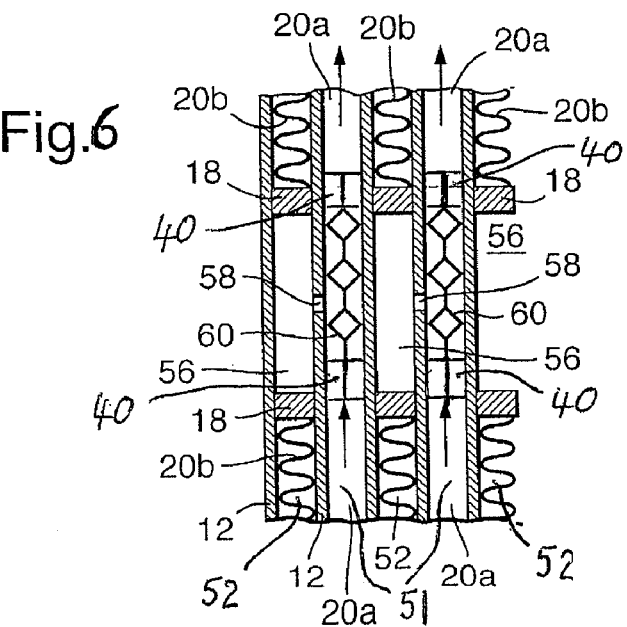
FIG. 6 shows a modification of the reactor view of FIG. 4.

This method of introducing the fuel into a channel is also applicable even if all the fuel is to be introduced near the inlet end of the combustion channel. In this case in particular, in addition to the provision of a turbulence-enhancing insert 60 in the vicinity of the fuel inlet slots 58, there might also be a non-catalytic insert 40 to enforce laminar flow and with gaps which are narrower than the maximum gap size for preventing flame propagation. As shown in FIG. 6, such an insert 40 may be provided both upstream and downstream of the positions at which fuel is injected into the gas stream, i.e. the fuel inlet slots 58, so in this case the non-catalytic inserts 40 to promote laminar flow are between the turbulence-enhancing insert 60 and the catalyst carriers 20*a*.

We claim:

1. A compact catalytic reactor, the reactor defining a multiplicity of first and second flow channels arranged alternately, the first flow channels having a transverse dimension no more than 10 mm and providing flow paths for combustible reactants and containing a removable fluid-permeable catalyst structure to catalyze combustion of the reactants, the first flow channels having at least one inlet for at least one of the reactants, wherein each first flow channel includes an insert adjacent to each inlet, this insert not being catalytic to the combustion reaction, wherein the catalyst structure and the insert each subdivide the first flow channel into a respective plurality of flow paths, the flow paths through the insert being smaller than those through the catalyst structure.

2. A reactor as claimed in claim 1 wherein the non-catalytic insert is of a material that does not form an alumina-rich surface coating or a catalytically active oxide film.

3. A reactor as claimed in claim 1 wherein the reactant supplied to the inlet is combustible, and the non-catalytic insert subdivides that part of the first flow channel adjacent to the inlet into a multiplicity of narrow flow paths which are narrower than a parameter, wherein the parameter is the maximum gap size for preventing flame propagation.

4. A reactor as claimed in claim 3 wherein a header is arranged to introduce air into a channel adjacent to an inlet portion of the first flow channel so as to maintain the non-catalytic insert at a lower temperature than the combustion catalyst in the first flow channel, wherein the inlet portion contains the non-catalytic insert.

5. A reactor as claimed in claim 3 wherein the reactant supplied to the inlet of the first flow channels is combustible and is supplied through a header to a multiplicity of the inlets, wherein a non-catalytic insert is located within the header adjacent to the inlets, and defines a multiplicity of narrow flow paths communicating with the inlets, which flow paths are narrower than a parameter, wherein the parameter is the maximum gap size for preventing flame propagation.

6. A reactor as claimed in claim 1 wherein the reactant supplied to the inlet comprises only part of the combustible reactants, the reactor defining apertures for supplying other reactants directly into the first flow channels, and wherein the non-catalytic insert is shaped to mix the injected reactants thoroughly with the reactants entering through the inlet.

7. A reactor as claimed in claim 6 wherein reactants are added to the first flow channels in stages at different positions along the first flow channels, such that the combustible reactants in the first flow channels are well below the stoichiometric ratio throughout the length of the first flow channel, and the flow paths defined by the catalyst structure are sufficiently narrow to prevent flame propagation.

8. A reactor as claimed in claim 6 wherein each first flow channel contains both a first non-catalytic insert to bring about thorough mixing, and also a second non-catalytic insert to define narrow channels both to promote laminar flow and to suppress flame propagation, the second non-catalytic insert being between the first non-catalytic insert and the catalytic structure for catalysing combustion.

\* \* \* \* \*